Feb. 5, 1963     E. LAGACE     3,076,675
DOOR OPERATING MECHANISM
Filed June 7, 1961     2 Sheets-Sheet 1

INVENTOR
Edouard LAGACE
By Pierre Lesperance
PATENT AGENT

Feb. 5, 1963  E. LAGACE  3,076,675
DOOR OPERATING MECHANISM
Filed June 7, 1961  2 Sheets-Sheet 2

INVENTOR
Edouard LAGACE
By Pierre Lespérance
PATENT AGENT

# United States Patent Office 3,076,675
Patented Feb. 5, 1963

3,076,675
DOOR OPERATING MECHANISM
Edouard Lagace, 6657A Alma St., Montreal,
Quebec, Canada
Filed June 7, 1961, Ser. No. 115,393
4 Claims. (Cl. 296—44)

This invention pertains to a door operating mechanism and more particularly such a mechanism as applicable to an automobile.

The invention provides means whereby it is possible to open the back door of an automobile located on the side opposite the driver's seat, without having to leave the driver's seat or to stretch out across the back of the front seat.

Such a device is particularly useful to taxi drivers, as well as private chauffeurs, as it permits them to courteously open or close the rear door to passengers getting in or out of the rear section of the car.

Such mechanisms have heretofore, been proposed but have been found altogether too cumbersome and awkward, due to the use of complex leverage components. These devices also lacked attractiveness, which is one important consideration in a public vehicle.

The invention of the instant application obviates these inconveniences by providing, in an automobile having a driver's station and a door on the side opposite the driver's station, a combination comprising: a rail bar extending across the automobile, parallel to said driver's station; a handle bar pivotally connected at one end to a door latch actuating mechanism for said back door, and rotatably coupled, at the other end, to a guiding assembly slidably mounted on said rail bar; means at the later end for pivoting said handle bar and operating said door latch actuating mechanism.

A better understanding of the invention, as well as additional advantages and objects, will become apparent as the following description proceeds having reference to the annexed drawings wherein:

FIGURES 1 and 2 shown, in dotted outline, the interior of a car; FIGURE 1 showing the back door closed and FIGURE 2 showing it open; the invention being shown in full lines.

Figure 1:
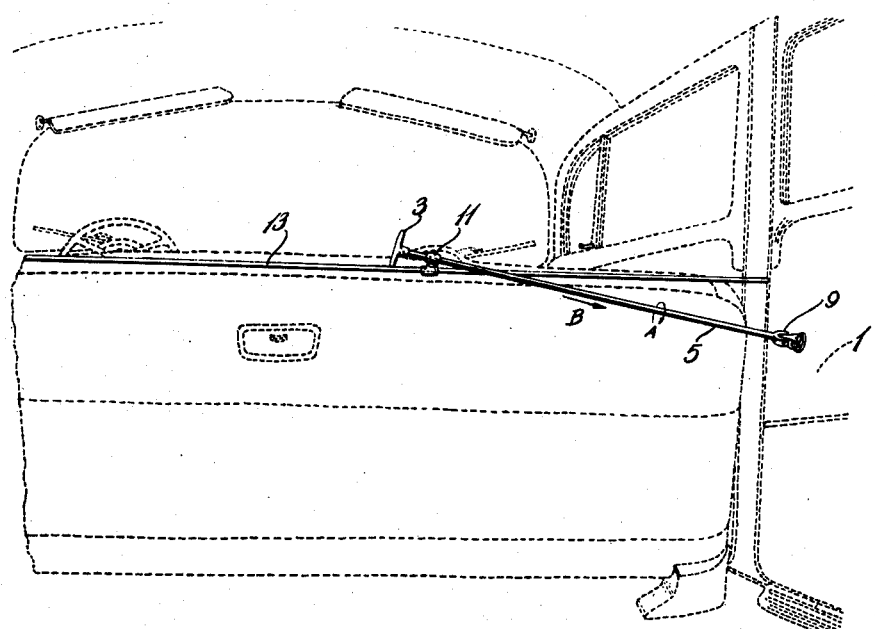
Figure 2:
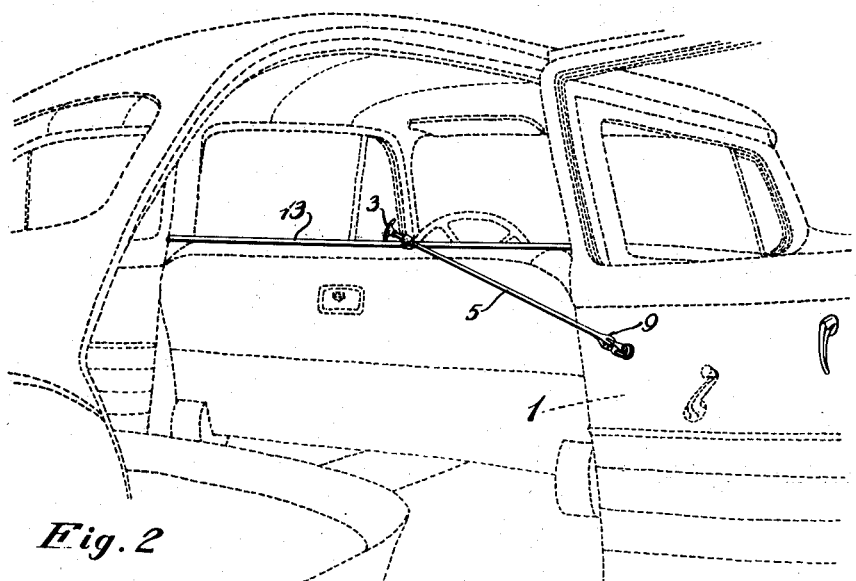

FIGURES 1 and 2 readily show the operation of the invention. Back door 1 is shown closed, in FIGURE 1. The door latch is then located in its housing (not shown). In order to open the door, handle 3 is turned so as to rotate handle bar 5 in a clockwise direction (or the reverse diretcion in some cases). This will pull the latch out of its housing and release door 1 which can then be opened by pushing handle bar 5 outwardly. Closing of the door is done by reverse operation, i.e., by pulling on handle 3. Because of a return spring tending to push the door latch outwardly, handle bar 5 will freely rotate in opposite direction, when the grip thereon is released after the door is opened. It is, therefore, only necessary to pull on the handle, in order to close the door.

During the door opening operation, handle bar 5 is successively subjected to a rotating motion as well as a pushing motion: Since one end of bar 5 is connected to a door latch actuating mechanism 7 (FIGURE 6), it can only be connected thereto, through a universal joint 9 (FIGURE 5), on account of the rotating action of handle bar 5 and the pivoting action of the door during the pushing motion.

In order to make it possible to actuate the door operating mechanism, handle bar 5 is rotatably connected at one end to a guiding assembly 11 slidable, as aforesaid, on a guiding rail 13. This guiding rail 13 is mounted, by any known means, to the sides of the automobile and is substantially parallel to the front seat while located slightly rearwardly thereof. Rail 13 can, of course, be made square, if deemed more convenient.

Figure 3:
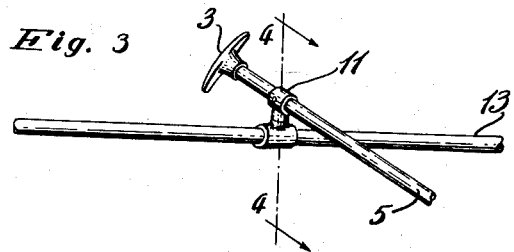
FIGURE 3 illustrates the guiding assembly as mounted on the rail bar; the handle bar being shown coupled to the guiding assembly.
Figures 4, 5:
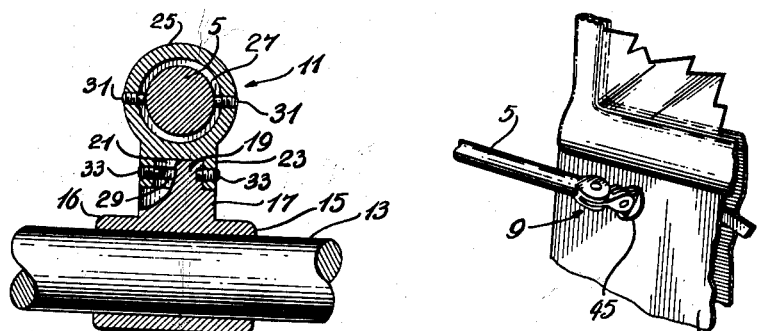
FIGURE 4 is a sectional view along line 4—4 of FIGURE 3.
FIGURE 5 shows the connection of the other end of the handle bar to the door latch actuating mechanism.

A preferred guiding assembly is shown in FIGURES 3 and 4, particularly FIGURE 4. As seen, it is composed of a guide journal 15 freely slidable on rail 13 and provided with a radial extension 17, normal to the axis of the portion 16 slidable on rail 13. Extension 17 ends with cylindrical protrusion 19, receivable into a corresponding cylindrical recess 21 of a radial projection 23. Projection 23 is a radial extension, normal to the axis of a bar sleeve 25.

To prevent handle bar 5 from sliding in bar sleeve 25, it is provided with a circumferential groove 27 which receives diametrically opposed locating pins 31 screwed into the wall of sleeve 25. Thus, longitudinal displacement of bar 5 in relation to the guiding assembly is prevented, although rotation thereof is yet possible.

In a similar manner, protrusion 19 has, circumferentially thereof, a groove 29 slidably receiving locating pins 33 screwed into the wall of projection 23.

Finally, the latch actuating mechanism 7 (FIGURE 6) is composed of a lever 35 pivotally connected at one end to a crank 37 and at the other end to link 39, but otherwise free of door 1. The other end of link 39 is rigidly fixed to a shaft 41 of the door latch assembly (not shown). It will be understood that rotation of shaft 41, and hence link 39, actuates the door latch and pulls it out of its door frame housing.

The other end of crank 37 is fixed to a pivot connection 43 on door 1. This pivot connection comprises a bracket 45 to which is joined one section of the universal joint 9.

Figure 6:
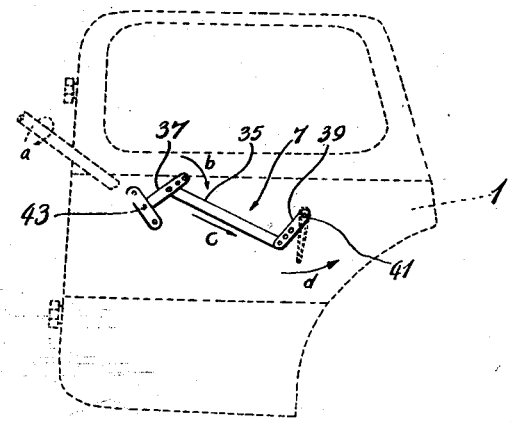
FIGURE 6 illustrates one door latch actuating mechanism proposed with the instant invention.

Perusal of FIGURE 6 will readily show that rotation of handle bar 5 in the direction shown by arrow *a* will produce actuation of the various components of the door latch actuating mechanism along arrows *b*, *c* and *d*.

It will be understood that various modifications to the aforesaid mechanism could be resorted to without departing from the spirit of the invention as specified in the appended claims.

What I claim is:

1. In combination, a vehicle body having an entrance and exit opening, an outwardly swinging door hingedly mounted on said body and normally closing said opening, a latch operating rotatable member operatively mounted on the interior side of said door, a remote-controlled mechanical manually actuatable device for operating said latch operating member to release the door and then forcibly swinging said door open, comprising a substantially horizontal guide rail extending across and secured at its ends to said body, a sleeve member slidably mounted on said guide rail for guided movement along the same, a rigid bar, a universal joint connecting one end of said bar to said latch operating member, a handle member secured to the other end of said bar, said bar rotatably and pivotally connected to said sleeve member adjacent said other end, but longitudinally fixed with respect to said sleeve member, whereby rotation of said handle member and bar will operate said latch operating member to release said door and subsequent pushing on said handle member will swing said door open, said sleeve member moving along said guide rail during the door opening movement.

2. In the combination claimed in claim 1, wherein said vehicle body has a front seat and a back therefor, said guide rail mounted above and along said back.

3. In the combination claimed in claim 1, wherein said vehicle body has a front seat defining a driver's station at one side thereof, said front seat having a back, said guide rail extending above and along the top of said back, said door being a back door of said vehicle body opposite to said driver's station.

4. In the combination claimed in claim 1, wherein said bar has a circular cross-section and said sleeve member is rotatable about said bar, the connection between said bar and sleeve member comprising a second sleeve member rotatably connected to said first sleeve member and surrounding said bar, and means carried by said second sleeve member and engageable with said bar to prevent longitudinal movement of said bar with respect to said second sleeve member while allowing rotation of said bar within said second sleeve member.

References Cited in the file of this patent
UNITED STATES PATENTS

| | | |
|---|---|---|
| 310,352 | Wollensak | Jan. 6, 1885 |
| 324,989 | Driggs | Aug. 25, 1885 |
| 404,020 | Sprague | May 28, 1889 |
| 2,674,486 | Alderfer | Apr. 6, 1954 |
| 2,683,619 | Anderson | July 13, 1954 |